June 3, 1930.   A. J. OBERG ET AL   1,761,361
CONTROL MECHANISM FOR COLOR PROJECTING MACHINES
Filed March 20, 1928
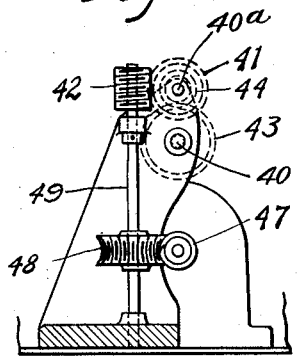
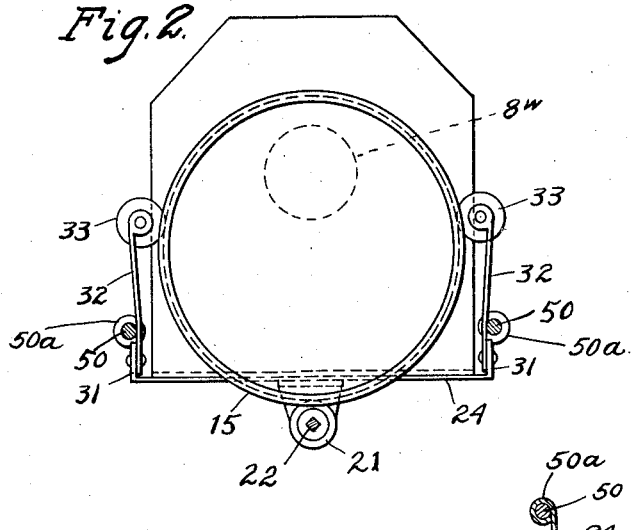
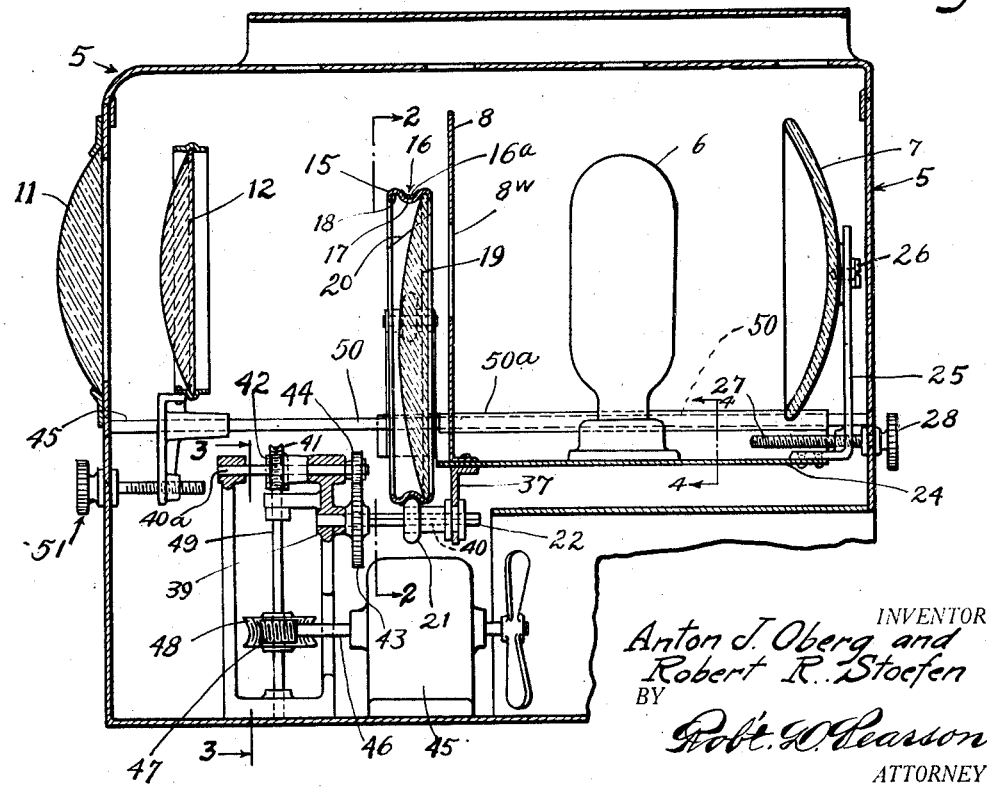
INVENTOR.
Anton J. Oberg and
Robert R. Stoefen
BY
Robt. W. Pearson
ATTORNEY.

Patented June 3, 1930

1,761,361

UNITED STATES PATENT OFFICE

ANTON J. OBERG AND ROBERT R. STOEFEN, OF LOS ANGELES, CALIFORNIA

CONTROL-MECHANISM FOR COLOR PROJECTING MACHINES

Application filed March 20, 1928. Serial No. 263,154.

This invention relates to control mechanism for color projecting machines and the like.

Among the objects of the invention are to provide a more dependable, simple and effective means for supporting and adjusting the lamp, reflector and image-producing or color supporting element.

The invention further relates to means for supporting and rotating lenses. The lens supporting and rotating construction of this invention is more particularly intended to rotate lenses in color projecting machines, but may be used to impart a rotary movement to lenses in other situations if desired. In the embodiment of the invention hereinafter illustrated and described the invention is applied to a plano-convex lens, and it is particularly useful when applied in this way, but the invention as defined by the claims is by no means limited to lenses of such a shape.

Another object of the invention is to provide means particularly adapted to support and rotate colored glass plates and lenses, particularly lenses of the plano-convex type, whether said lenses are differently colored in different parts, or whether they have inscribed upon them or formed in them figures or characters of any kind to which it is desired to impart motion.

With the foregoing and other objects and advantages in view, as will more fully hereinafter appear, the invention consists in the various parts, combination of parts, and details of construction hereinafter described in connection with the accompanying drawings, and then more specifically pointed out in the claims.

Referring to the accompanying drawings which illustrate a preferred embodiment of the invention, Figure 1 is a vertical midsection taken lengthwise of the machine.

Figure 2 is a cross section on line 2—2 of Figure 1.

Figure 3 is a cross section on line 3—3 of Figure 1.

Figure 4 is a sectional-detail on line 4—4 of Figure 1.

Referring in detail to the drawings, within the casing 5 is mounted the lamp 6, reflector 7, screen 8, having window 8$^w$, condensing lens 11 and internal lens 12, all of these parts separately considered, forming no part of our present invention but being briefly referred to in order to point out the manner in which our invention cooperates with the other elements of a motion picture machine.

Referring now to the construction of our newly invented construction, 15 designates a sheet metal annulus which is provided with lens of such a character as to provide at its mid-width a peripheral external groove 16 opposite to an internal peripheral bead 17, also an internal groove 18 at each side of the bead 17. Within one of the side grooves 18 is seated a plano-convex lens 19, the convexity of said lens projecting across the mid-width of the annulus, as well shown in Figure 1. This method of mounting the lens within the annulus brings the center of gravity of a lens of this character substantially over the mid-width of the annulus.

The annulus 15 is diagonally cut across at 20 and the metal of the annulus possess considerable resiliency, so that it may be expanded for insertion of the lens and will then contract down upon the periphery of the lens till the free ends of the ring meet each other at the slit 20.

Owing to the slit 20 of annulus 15 extending diagonally across said annulus, the driving roller 21 will glide more smoothly over the slitted portion of the annulus than would be the case if said slit extended at a right angle to the portion of the rim where it is located.

In order to insure a good frictional contact between the driving roller and the disk or lens carrier, a strip of adhesive tape 16$^a$ is drawn closely around said carrier which it engages at the bottom of groove 16. This tape not only provides against slipping of the driving pulley but also aids in keeping the disk or lens carrier in close embrace over the disk or lens 19.

In order to rotate said lens for the purpose of causing a movement of the colors, reading matter or light refracting means carried by the lens upon the background or screen (not shown) upon which the color projecting machine is projecting images, a friction roller 21 is mounted beneath said disk upon a square shaft 22, the upper side of said roller engaging the lower side of the annulus 15 within the groove 16 of said annulus. The driving means for said shaft 22 will be described later.

Referring now to the construction for controlling the size and clearness of the image, upon a base plate 24 which forms part of a traveling carriage is mounted a rear end bracket standard 25 to which the reflector 7 is secured by any desirable fastening device, for example the screw 26. Through said standard 25 extends a horizontal adjusting screw 27 having an operating head 28 which projects beyond the rear end of the casing. The base plate also supports the lamp 6 and the screen 8. Base plate 24 is provided at each side of its front end with an extension 31 and to each of these extensions is secured a resilient upright arm 32 which carries at its upper end a roller 33. These rollers 33 yieldingly engage the peripheral groove 16 in the annular carrier 15 which supports the lens or colored plate 9.

To the front end of base plate 24 is also secured a downwardly extending hanger arm 37 which supports one end of the square shaft 22, the other end of said shaft being supported by the frame member 39. Said shaft 22 has slidably fitted thereon a sleeve or bushing 40 having a grooved peripheral portion, which is rotatively supported by the hanger 37. Said bushing is provided at its front end with a circular head which forms the roller 21 which seats in the groove 16 of the annulus 15 and thereby rotatively supports said annulus together with the glass member 9 carried thereby.

As shown in detail in Fig. 4, the sleeve 50ª constitutes a curled portion of an upward extension 24ª with which the base plate 24 is provided. Said sleeve 50ª slides freely back and forth upon the guide rod 50 when the screw 28 is rotated, said screw having an operative engagement with the standard 25 carried by said base plate 24.

Returning to the square shaft 22, said shaft carries a driven gear 43 in mesh with a driving gear 44, the rotation being imparted to the latter gear from the motor 45 by means of the motor shaft 46, gears 47 and 48 intermediate shaft 49 and supplemental shaft 40ª in conjunction with gears 41 and 42.

The carriage base 24 is supported and guided in its back and forth movements by the guide rods 50 which extend from end to end of the casing.

By the arrangement of parts which has just been described, the operator, by rotating the screw 28 can simultaneously move reflector 7, lamp 6, screen 8 and glass element 19 without disturbing the spacing of these elements with relation to each other. The shifting of the glass element 19 is accomplished by reason of the side rollers 33 and its supporting roller 21 all moving with the base plate 24 of the carriage. The purpose of the adjusting movement just described is to properly focus the image producing element and the source of light with respect to the lenses 11 and 12.

The lens 12 is adjustable back and forth in a well known manner by means of the manually operable screw 51.

We claim:

1. In a device of the class described, in combination, a sheet metal annulus having along the mid-width of its periphery an inwardly projecting bend to form a groove around its outer side and a bead along its inner side, a lens fitted within said annulus and at one side abutting against said bead, said annulus being provided with means, which engage the other side of said lens to retain the latter in place, a driving roller frictionally engaging said groove, and means to rotate said roller.

2. In a device of the class described, the combination, with a lens proper; of a sheet metal annulus having along the mid-width of its periphery an inwardly projecting bend to form a grove around its outer side and a bead along its inner side, said annulus having also an internal peripheral groove at each side of said bead, said lens being fitted within one of said side grooves and having a convexity which projects across the mid-width of said annulus, a driving roller mounted beneath said annulus and engaging the groove of the latter, and means for rotating said roller.

3. In a device of the class described, a split resilient annulus of sheet metal, said annulus having an internal groove therearound, a light-transmitting disk mounted within the groove of said annulus and held in place by the resiliency of said annulus, a roller frictionally engaging said annulus to rotate the same, means for rotating said roller, and means for cooperating with said roller to hold said annulus rotatively in the operative position.

4. In a device of the class described, a light-transmitting disk, means extending around said disk to form a carrier therefor, an anti-friction roller engaging said carrier at each side, means to yieldingly press said rollers toward said carrier, said rollers maintaining said carrier and disk in an upright position, a driving roller whereon the lower side of said disk rests and means to rotate said roller.

5. In a device of the class described, a light-transmitting disk, means extending around said disk to form a carrier therefor, an anti-friction roller engaging said carrier at each side, resilient substantially vertical arms carrying said rollers at their free ends to press them yieldingly against said carrier, a driving roller supporting and frictionally engaging said carrier, and means to rotate said roller.

6. In a device of the class described a light-transmitting disk, means extending around said disk to form a carrier therefor, said carrier having an external peripheral groove, a strip of tape encircling said carrier and resting upon the bottom of said groove, a roller operatively engaging said tape to rotate said carrier, and means for rotating said roller, said tape being of a character to prevent slipping of said roller thereupon.

7. In a device of the class described, a resilient, split light-transmitting disk, means extending around said disk to form a carrier therefor, said carrier having an external peripheral groove, a strip of tape encircling said carrier and resting upon the bottom of said groove, a driving roller operatively engaging said tape to rotate said carrier, and means for rotating said roller, said tape being of a character to prevent slipping of said roller thereupon.

8. In a device of the class described, a light-transmitting disk, means extending around said disk to form a carrier therefor, said carrier having an external peripheral groove, a roller extending into said groove beneath said carrier to operatively support the latter, means for rotating said roller, and means to support said roller and to adjust its position lengthwise its axis of rotation.

9. In a device of the class described, a light-transmitting disk, means extending around said disk to form a carrier therefor, said carrier having an external peripheral groove, a roller extending into said groove beneath said carrier to operatively support the latter, means for rotating said roller, means to support said roller and to adjust its position lengthwise its axis of rotation, a condensing lens, a lamp, a carriage whereon said lamp and the means for supporting said roller are mounted, and means for manually adjusting the position of said carriage toward and away from said condensing lens.

10. In a device of the class described, a resilient sheet metal annulus, said annulus being split diagonally across its width and having a peripheral groove therearound and a corresponding bead therewithin opposite to said groove, a circular light transmitting-element mounted within said annulus, one side of said element engaging said bead, said annulus being provided with means in engagement with the other side of said element to removably retain it in place, means for rotatably maintaining said annulus in an upright position during its rotation, and a driving roller for said annulus contacting with its peripherally grooved portion.

In testimony whereof we affix our signatures.

ANTON J. OBERG.
ROBERT R. STOEFEN.